Aug. 4, 1936.    J. W. KENNEDY    2,050,099
SPRING SUSPENSION FOR VEHICLES
Filed April 26, 1934

Inventor:
John Wallace Kennedy
By Williams, Bradbury, McCaleb & Hinkle
Attys

Patented Aug. 4, 1936

2,050,099

UNITED STATES PATENT OFFICE 2,050,099

SPRING SUSPENSION FOR VEHICLES

John Wallace Kennedy, Glasgow, Scotland

Application April 26, 1934, Serial No. 722,434
In Great Britain May 19, 1933

10 Claims. (Cl. 267—20)

This invention relates to an improved spring suspension and shock absorbing or vibration damping arrangement for vehicles.

According to the present invention the vehicle suspension comprises a rigid axle supporting member attached at one or both ends to the vehicle frame by means of a pivoted lever, pivoted intermediate its ends to the axle supporting member and having one end attached to the vehicle frame by means of a link and the other end extending substantially horizontally and working between a pair of vertically opposed springs directly mounted on the vehicle frame whereby when the frame is tending to force one end of the lever downwards the other end is tending to force the frame upwards so that one counteracts the other and on the rebound the converse occurs.

The pivoted lever may be a double-armed lever or it may comprise separate arms connected to turn together on the same axis or fulcrum; in either case one arm will constitute an intermediate link connecting the axle-supporting member to the aforementioned link.

The vehicle suspension is preferably fitted to each end of the front and/or rear axle of the vehicle and either longitudinally or transversely with respect to the axle as desired, the axle-supporting member being connected intermediate its ends to the axle by any convenient means.

In order that the invention may be more clearly understood reference is hereinafter made to the accompanying drawing diagrammatically illustrating three forms of the invention applied to one of the axles of a vehicle.

Figure 1:
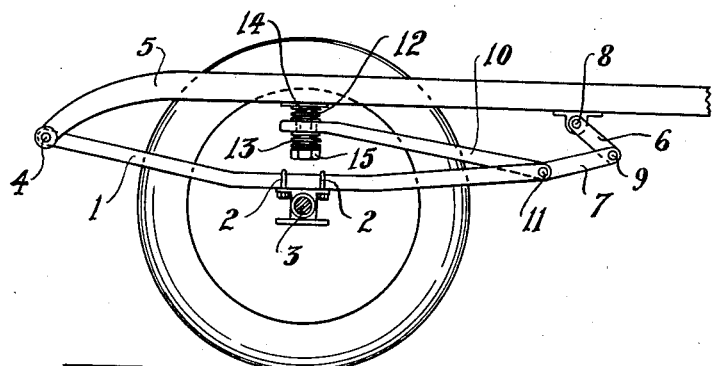
Fig. 1 is a side view of one form of the invention with the suspension member transverse to the axle.

The vehicle suspension shown in Fig. 1 comprises a rigid axle-supporting member 1 which is secured in any convenient manner intermediate its ends, such as by U-bolts 2, to a transverse axle 3. The axle 3 may be below the member 1 as shown, or it may be mounted above the member 1.

The axle supporting member 1 is pivoted at 4 to one of the frame bars 5 of the vehicle frame and is articulated at its other end to the frame bar 5 through a pair of toggle links 6 and 7. The member 1 may be carried in this manner either directly below the frame bar 5 or below and at one side thereof or a pair of members 1 may be mounted below and one at each side of the frame bar 5. The member 1 may be either underhung as shown, or it may be attached to the frame bar 5 in such a manner by a pivot 4 and toggle links 6 and 7 that the member 1 is at a higher lever than that shown, thus reducing the height of the vehicle frame from the ground.

The outer toggle link 6 is attached by a shackle pin 8 to the frame bar 5 or to some other convenient part of the vehicle and is pivotally connected to the intermediate toggle link 7 by a connecting pin 9. The link 7 forms one arm of a double-armed lever 10 which is pivoted at 11 to the member 1. The floating end of the double-armed lever 10 is constrained to move between a pair of opposing springs 12 and 13 which are mounted on the vehicle frame in any convenient position. As shown, helical springs 12 and 13 are mounted upon a stud 14 passing through a slot in the double-armed lever 10. The springs 12 and 13 are so selected and adjusted for normal compression that the double-armed lever 10 assumes a substantially central position between the opposing springs when the vehicle is under normal load. Under excess load, the member 1 tends to turn about the pivot 4, thereby tending to close the links 6 and 7, this closing movement being opposed by compression of the spring 12, so that on the reduction of the load or on the rebound, the extension of the spring 12 tends to return the double-armed lever 10 and links 6 and 7 to normal position, thereby returning the member 1. Any excess rebound tends to cause opening movement of the links 6 and 7 which is counteracted by compression of the spring 13. In this manner the contrivance acts not only as a vehicle suspension but also as a shock absorbing or vibration damping system.

The springs 12 and 13 may, as shown, be situated between the member 1 and frame bar 5, the stud 14 depending from the frame bar 5 and being fitted with fixed or adjustable spring pads or washers or a nut 15 for adjusting the compression of the springs. Alternatively, the springs 12 and 13 may be retained in position by any suitable retaining means, the spring 13 being situated in compression between the member 1 and the double-armed lever 10 and the spring 12 being situated in compression between the double-armed lever 10 and the frame bar 5. Instead of the helical springs 12 and 13, the floating end of the double-armed lever 10 may be confined between opposed laminated plate springs or opposed pneumatic springs or any other type of spring.

Each of the links 6 and 7 may be either a single link or double link, and the double-armed lever 10 may be of any suitable form adapted to be engaged between opposing springs and to turn with the link 7.

The distances of the centres of the pivot 11 and shackle pin 8 from the centre of the pivot pin 4 may be so determined and related to one another as to give the best conditions of balance to the double-armed lever 10 to suit the load the vehicle is designed to carry.

Figure 2:
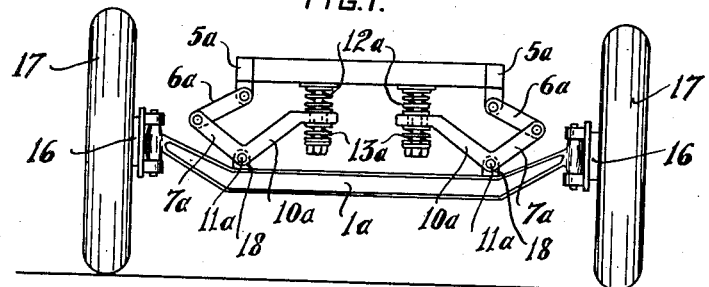
Fig. 2 is a front view of a modified form of the invention with the suspension members arranged longitudinally with respect to the axle.

In Fig. 2 of the drawing which illustrates the invention applied longitudinally of the wheel axle, each side frame 5a is attached by toggle-jointed links 6a, 7a, to a rigid member 1a, which in this case forms the cross member between the stub axles 16 of the wheels 17. The links 7a each form one arm of double-armed levers 10a pivoted at 11a to lugs or brackets 18 on the member 1a, the floating ends of the double-armed levers being constrained to move between pairs of opposing springs 12a and 13a mounted on the vehicle frame in a similar manner to the springs 12 and 13 described with reference to Fig. 1.

Figure 3:
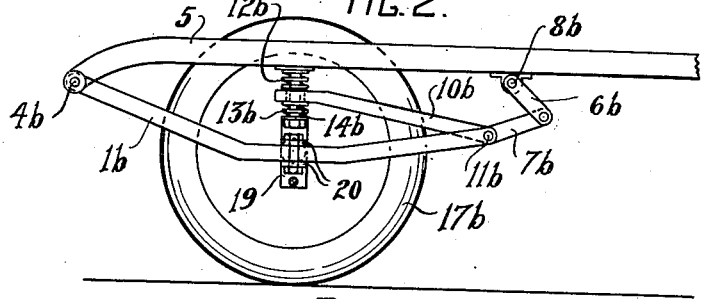
Figs. 3 and 4 are side view and front view of a further form of the invention adapted to suit a vehicle with independently suspended front wheels.
Figure 4:
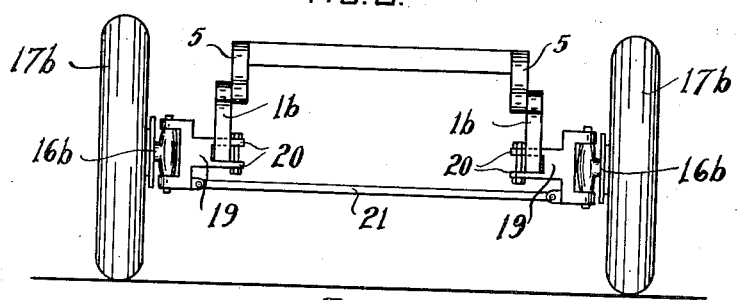

In Figs. 3 and 4 the suspension members are arranged similar to Fig. 1 except that a rigid member 1b is attached to brackets 19 which carry the stub axles 16b of the wheels 17b. The brackets 19 are fitted with flanges 20 between which the member 1b is securely clamped and a radius rod 21 connects the undersides of the brackets 19 to keep the wheels in alignment. The member 1b may be clamped to the bracket 19 so that it can be adjusted forwards or backwards as required.

The rigid member 1b is pivotally attached at one end at 4b to one of the longitudinal frame bars 5 of the vehicle, and the other end of the member 1b is attached by toggle links 6b and 7b to a shackle pin 8b on the frame bar 5. The toggle link 7b turns with a lever 10b on a pivot pin 11b on the member 1b and the free end of the lever 10b is constrained to move between a pair of opposing springs 12b and 13b mounted on a stud 14b carried by the frame bar 5 as in Fig. 1.

The improved vehicle suspension eliminates road shocks from being transmitted through the axle from wheel to wheel or from the front axle to the steering gear, as the rigid axle-supporting member does not allow the axle to stagger up and down or rock with road shocks. The wheels are positively held to the road at all speeds, as the floating end of the double-armed lever which takes the load is supported between opposing springs, one spring taking the weight of the load and the other spring taking the rebound, and thereby damping each other and eliminating wheel spin and consequent tyre wear and loss of power, and also automatically checking body roll on swerving or bends and the tendency to skid. The improved suspension also keeps the axle and road wheels positively in correct position at all times as the axle-supporting member is rigid and the distances from the centre of the pivot pins 4 to the centre of the axle 3 in Fig. 1 remain practically constant at both ends of the axle during the opening and closing movement of the links 6 and 7 under road shocks and thus do not alter the transverse alignment of the axle, whereas when the axles are fixed direct to laminated plate springs, the unequal deflection of the springs at opposite ends of the axle causes displacement of the axle out of its true transverse position. The improved suspension thus keeps the vehicle more steady on the road; it moreover eliminates the danger of accidents caused through broken springs, since in the event of a spring breaking the axle is still retained in its true transverse alignment and the weight of the vehicle is supported by the member 1, 1a or 1b and lever 10, 10a or 10b. The replacement of a broken spring is also a simple operation.

I claim:

1. In combination with a vehicle frame, an axle-carrying member, means pivotally attaching one end of said member to the frame, a pair of pivotally connected toggle links, one pivotally attached to the other end of said member and the other turning at its end on a pivot stationary with respect to said frame, a lever directly attached to the link which is pivotally attached to the end of the axle-carrying member, and a pair of opposed springs acting upon opposite sides of said lever.

2. The combination with the wheel axle of a vehicle frame of a spring suspension for each end of the axle comprising a member pivoted at one end to the frame, means connecting said member intermediate its ends to the axle, a pair of pivotally connected toggle links directly connecting the other end of said member to a fixed pivot on the frame, a lever turning with and directly attached to that link of the pair of toggle links which is directly connected to said member, and a pair of opposed springs acting upon opposite sides of said lever.

3. In combination with a vehicle frame, a spring suspension comprising an axle-carrying member, a pair of pivotally-connected toggle links consisting of a lower and an upper link, means pivotally attaching the lower link to said member, means stationarily located on the vehicle frame for pivotally attaching the upper link to said frame, a lever fulcrumed on the pivotal axis connecting the lower link to said member, said lever being connected to said lower link to turn therewith about said pivotal axis and thereby counteract any relative movement between said member and said frame, and a pair of opposed springs acting upon opposite sides of said lever.

4. In combination with a vehicle frame, a spring suspension comprising an axle-carrying member, a pair of pivotally-connected toggle links consisting of a lower and an upper link, means pivotally attaching the lower link to said member, means stationarily located on the vehicle frame for pivotally attaching the upper link to said frame, a lever fulcrumed on the pivotal axis connecting the lower link to said member, said lever being integral with said lower link to turn therewith about said pivotal axis and thereby counteract any relative movement between said member and said frame, and a pair of opposed springs acting upon opposite sides of said lever.

5. In combination with the wheel axle and vehicle frame of a vehicle, a spring suspension comprising a rigid member connected to the wheel axle, means articulating one end of said member to the vehicle frame, a pair of pivotally-connected toggle link directly connecting the other end of said member to a fixed pivot on the vehicle frame, said links consisting of an inner link pivoted to said member and an outer link pivoted to said frame, a lever turning with the inner link about its pivotal connection to said member, a stud fixed to the vehicle frame and passing through a slot in said lever, springs mounted on said stud on opposite sides of said lever, and adjustable means for retaining said springs in position on said stud.

6. In combination with a vehicle frame having independently suspended front wheels mounted on stub axles, a stub axle bracket for each stub axle, a longitudinally disposed member supporting each of said brackets and articulated at one end to the frame, a pair of pivotally-connected toggle links directly connecting the other end of said member to a fixed pivot on the frame, a lever turning with one of each of said pairs of links, a pair of opposed springs acting upon opposite sides of each lever, and a connecting member connecting said stub axle brackets.

7. In combination with a vehicle frame, a rigid axle-carrying member and means articulating the axle carrying member to the frame and permitting relative movement between said frame and member comprising a pair of pivotally-connected toggle links consisting of an upper link and a lower link pivoted together and inclined oppositely to one another in an upward and downward direction respectively, from their pivotal connection to each other, means pivotally attaching the lower end of the lower link to said member, means directly pivoting the upper link about a fixed pivot on the vehicle frame, a lever fulcrumed on the pivotal axis connecting the lower link to said member, said lever being connected to said lower link to turn therewith about said pivotal axis and being inclined upwards from said axis in the opposite direction to the lower link, a pair of opposed springs acting on opposite sides of said lever, and means for mounting said springs on the vehicle frame.

8. In combination with a vehicle frame, a rigid axle-carrying member and means articulating the axle carrying member to the frame and permitting relative movement between said frame and member comprising a pair of pivotally-connected toggle links consisting of an upper link and a lower link pivoted together and inclined oppositely to one another in an upward and downward direction respectively, from their pivotal connection to each other, means pivotally attaching the lower end of the lower link to said member, means directly pivoting the upper link about a fixed pivot on the vehicle frame, a lever fulcrumed on the pivotal axis connecting the lower link to said member, said lever being made integral with said lower link and being inclined upwards from said axis in the opposite direction to the lower link, a pair of opposed springs acting on opposite sides of said lever, and means for mounting said springs on the vehicle frame.

9. In a vehicle, a rigid axle-carrying member, a frame, at least one pair of opposed resilient means associated with said frame, and means connecting at least one end portion of said member to said frame and said opposed resilient means in a manner to permit limited relative movement between said frame and member opposed by said resilient means, said connecting means including a lever arranged to move in a direction to counteract the relative movement of the frame and rigid axle-carrying member said lever being pivoted intermediate its ends to said axle-carrying member and being connected at its ends to said frame and opposed resilient means respectively.

10. In a vehicle, a rigid axle-carrying member, a frame for the body of the vehicle, at least one pair of opposed resilient means associated with said frame, and means articulating at least one end of said member to the frame, comprising a link turning at one of its ends on a pivot stationary with respect to the frame, a second link interposed between said member and said first link, and a lever associated with said second link and said opposed resilient means in a manner to counteract any relative movement between said member and said frame.

JOHN WALLACE KENNEDY.